United States Patent [19]

Roach

[11] Patent Number: 4,729,576
[45] Date of Patent: Mar. 8, 1988

[54] DEVICE FOR TANDEM MOVEMENT OF IV-POLE AND GURNEY

[76] Inventor: Keyton W. Roach, 812 Mark St., High Point, N.C. 27260

[21] Appl. No.: 841,943

[22] Filed: Mar. 20, 1986

[51] Int. Cl.⁴ .............................................. B60D 1/04
[52] U.S. Cl. ...................... 280/493; 5/508; 280/292; 280/289 WC; 403/316
[58] Field of Search ............... 280/292, 400, 289 R, 280/289 WC, 204, 493, 494, 480, 481, 482, 483, 493, 495, 504; 403/315, 316, 317; 5/508

[56] References Cited

U.S. PATENT DOCUMENTS

| 693,379 | 2/1902 | Davis | 280/292 |
| 1,149,807 | 8/1915 | Bascom | 280/292 |
| 1,159,472 | 11/1915 | Christofferson | 403/315 |
| 1,535,397 | 4/1925 | Buffington | 280/493 |
| 2,127,387 | 8/1938 | Brattain | 280/493 |
| 2,497,234 | 2/1950 | Mylie | 280/494 |
| 4,511,158 | 4/1985 | Varga | 280/292 |

FOREIGN PATENT DOCUMENTS

| 867751 | 11/1941 | France | 280/204 |
| 2146962 | 5/1985 | United Kingdom | 280/493 |

Primary Examiner—John J. Love
Assistant Examiner—Everett G. Diederiks, Jr.
Attorney, Agent, or Firm—Charles R. Rhodes; Judith E. Garmon

[57] ABSTRACT

A towing device for connecting an IV-pole to a gurney when transporting a patient from one hospital area to another. The device includes an elongated body portion with a hook means attached on each end thereof. A spring-biased locking member associated with each of the hooks locks the hook into engagement with the respective gurney and IV-pole and prevents disengagement of the hooks therefrom.

3 Claims, 5 Drawing Figures

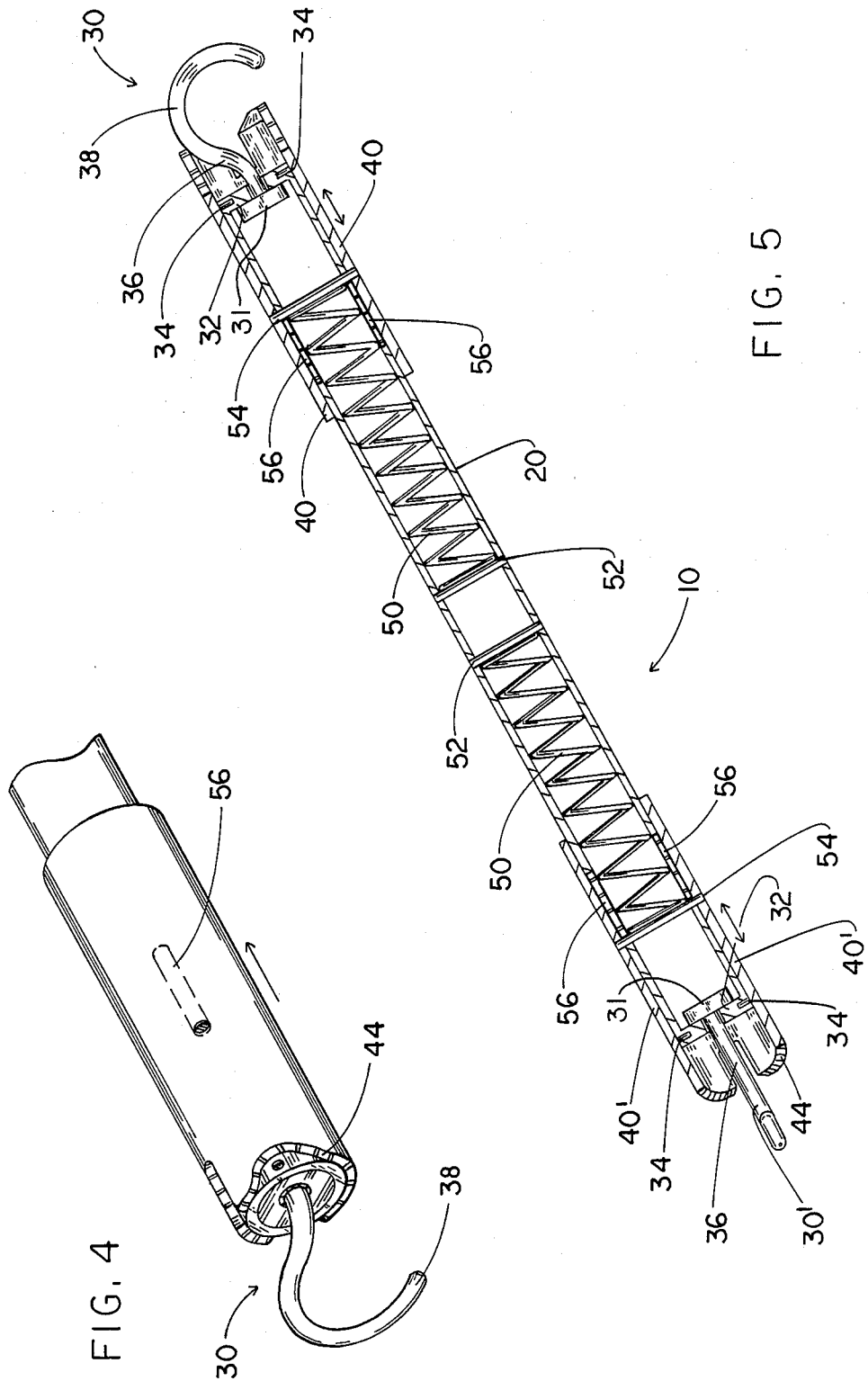

DEVICE FOR TANDEM MOVEMENT OF IV-POLE AND GURNEY

BACKGROUND AND SUMMARY OF THE PRESENT INVENTION

Although the present invention is potentially useful in a variety of environments, it was developed primarily for use in a medical facility. In moving patients from one treatment area to another, the practice prior to development of the present invention was to use personnel to guide an IV-pole along with the gurney or wheelchair. Such a procedure frequently required three people: two to handle the gurney and one to control the IV. For background, an IV (intravenous fluid) set-up includes the fluid bottle and the delivery line which delivers fluids/medications from the bottle to a needle in the patient's vein. The bottle is suspended from an upright IV-pole which may be permanently attached to the patient bed, or which is more frequently a separate unit comprised of a vertical pole mounted on rollers. The detached, mobile unit is the one most frequently used when moving patients. Therefore, because there has been no adequate and safe means for attaching IVs to gurneys and wheelchairs, extra personnel has been required for accomplishing transport. At the time of filing, other attempts at solving the problem were unknown to applicant. The present invention is thus a truly unique device for attaching an IV-pole to a gurney or wheelchair for towing purposes.

One reason that other known towing devices are unsuitable is because they are generally designed for use with automobiles, or in other environments where the relative motion between the towing vehicle and the object being towed is not as critical. In movement of patients it is highly important that the IV set-up be fully controlled at all times. Loss of control of an IV set-up is a potentially dangerous situation for a number of rather obvious reasons. Known towing devices allow considerable motion of the towed vehicle or object. With IV set-ups, there should be no movement of the IV set-up relative to the gurney or wheelchair. It is important that the two vehicles be moved substantially as one unit. However, it is also important that the connecting or towing device be easily attached to or detached from the gurney and the IV-pole. The attachment/detachment must be easily made by various levels of personnel and should be accomplished in seconds, with as few moving parts as possible. It is also recognized that the present invention is applicable in other environments where there are relatively small wheeled carts, tables, or other such devices which occasionally need to be moved in tandem.

The present inventor has attempted to overcome the disadvantages in moving patients with IVs and to provide a device that would meet the above objectives in medical or other environments. The present invention is a device that can be used for connecting or coupling two objects together for moving them in tandem. The device is comprised substantively of an elongated body portion having a hooking or connecting member on each end thereof. A spring-biased locking means is associated with each hooking member to lock the hook securely to a portion of the frame of the gurney and of the IV-pole respectively.

The device is of relatively small size, is simple in construction and thus economical to produce and maintain. There are a minimum of moving, interrelated parts, keeping the likelihood of failure, and cost of maintenance, to a minimum.

Other and further objectives and advantages will become apparent as the following detailed description is studied in conjunction with the accompanying drawings. In the drawings:

FIG. 4 is a perspective view, with parts broken away, of the embodiment of FIG. 3, showing the hook-engaging lock means, in a second, retracted position;

FIG. 5 is a cross-sectional view, taken along lines V—V of FIG. 3.

DETAILED DESCRIPTION OF A PREFERRED EMBODIMENT

Figure 1:
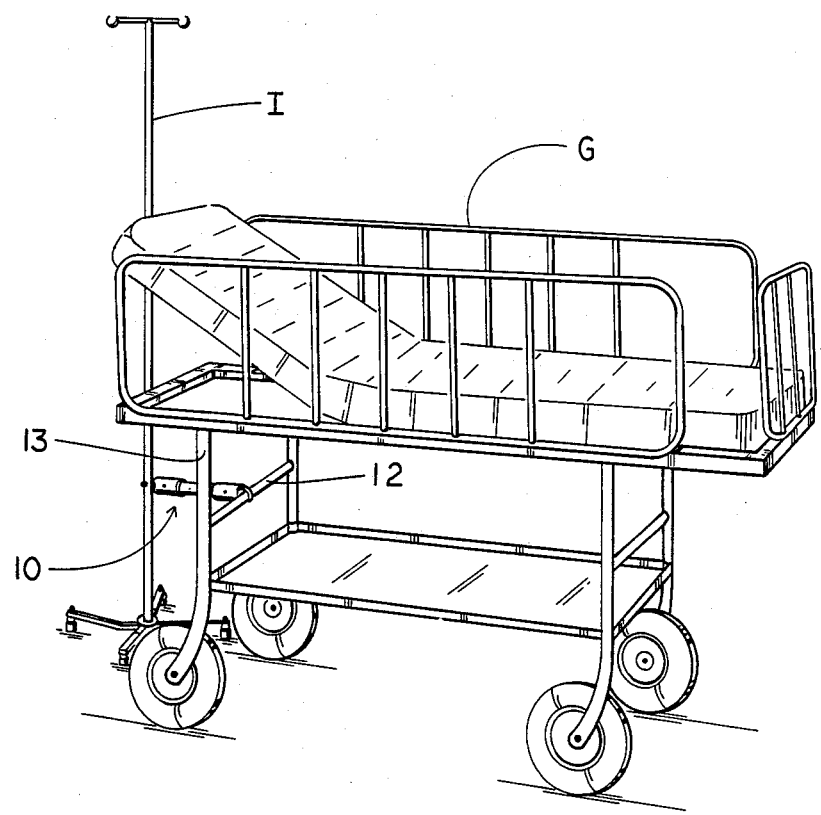
FIG. 1 is an environmental perspective of the present invention as it is used to connect a gurney to an IV-pole.
Figure 2:
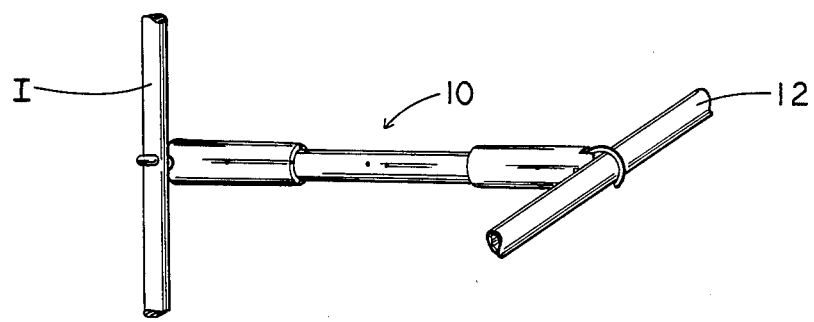
FIG. 2 is an enlargement of a portion of FIG. 1 illustrating the connection of the invention to the gurney frame.

Looking first at FIGS. 1 and 2, the present invention 10 is shown as connected between a gurney G and IV-pole I. As detailed in the enlargement in FIG. 2 the connecting or tow device 10 is comprised substantively of an elongated body portion 20, a hook member 30 mounted on each end thereof, and two relatively movable hook-engaging or locking members 40.

The body portion 20 is preferably formed of a tubular piece of material which may be metallic or one of the highly rigid, durable polymeric materials. The tubular body portion 20 is approximately one inch in diameter and in the preferred embodiment shown is made of stainless steel. Stainless steel would be the preferred material for reasons including strength, durability, and non-corrosiveness.

Hook members 30 and 30' are mounted in the respective ends of tubular body 20, as best shown in FIG. 5. In the preferred embodiment shown, hooks 30, 30' are round hooks that are rotatably mounted in the ends of the tube 20 by means of a permanently attached washer 31 and metallic plugs 32. The plugs 32 are recessed into the ends of tube 20 so that the surface of the plug lies in a plane substantially aligned with the ends of tube 20. The plugs 32 are permanently mounted by means of roll pins 34 or other similar pin means. The washers 31 or other similar stop means are a permanent part of the hook and prevent the hook from pulling out of the plug. Alternative means of mounting the hook-supporting plugs would include welding, soldering, etc. The method chosen requires that the plug 34 be permanently attached to the inner wall or ends of tube 20 to ensure that the tow device 10 does not fail and become disengaged during use.

As shown also in FIG. 5, the hooks 30, 30' are permanently mounted in the approximate center of plugs 32. Again, the means of mounting the hooks and plugs can include soldering, welding, or other means that substantially ensures the rotatable hook attachment will not fail during use of the tow device 10.

It should be noted that in the embodiment shown hooks 30 and 30' are turned 90° relative to each other to accommodate differing orientation of the frame areas on the gurney and the IV-pole to which the hooks are attached. The necessity of being able to so align the hooks is the reason for rotatably mounting the hooks.

Referring to FIG. 2, it is seen that the IV-pole I and the stretcher bar 12 on gurney G are both of cylindrical shape. IV-pole I extends vertically relative to the floor or surface on which it and stands, and stretcher bar 12 extends horizontally. Therefore it is necessary for the orientation of hooks 30, 30' to be coordinated therewith so that the hooks will seat securely on and substantially surround the respective bar. It is undesirable for the hooks to freely rotate during use because that would allow an undesirable degree of movement of the IV-pole relative to the gurney. The means for anchoring the hooks in position is described below. If the hooks are not rotatable, attachment of the device to both horizontal and vertical frame parts would be difficult if not impossible. For example, to attach hook 34 to the vertical support 13 of gurney G and the opposite hook to the vertical IV pole would cause interference between the wheels on the gurney and those on the IV-pole. Smooth transport would be nearly impossible to achieve.

To ensure that the hooks 30, 30' remain attached to the gurney and to the pole I respectively, a hook locking member 40, 40' is mounted on each of the ends of body 20. These locks 40, 40' are relatively short, tubular bodies which are telescopically mounted over the ends of body 20' and are axially movable thereon. The locks 40, 40' are movable from a first, or normal position which is extended beyond the end of body 20 and around the shank of the hook, to a second position wherein the locks 40 are retracted axially back over body 20 and thus away from the hooks, to permit attachment to or detachment from the pole I or gurney G. The locks 40, 40' are normally spring-biased in the first, or extended, position.

The spring-biasing means for locks 40, 40' are illustrated in FIG. 5 which details the pair of compression springs 50 that are mounted inside tubular body 20. Springs 50 are mounted inside tubular body 20, positioned between cooperating stop members 52 and 54. The members 52 are comprised of discs, washers, pins or other permanently and immovably mounted members which function to retain the springs 50 in a selected position inside tube 20. These members 52 thus are used as the seats for the inner ends of springs 50. Preferably the springs are mounted in spaced relationship in the approximate mid-portion of tubular body 20, although it is possible that one long spring extending the length of body 20 could be used.

The outer end of each spring 50 is seated against a second stop member which is comprised of a pin or small bar 54, the ends of which are mounted in the inner walls of locks 40 and 40'. The pins 54 extend through tubular body 20 by means of slots 56 which are cut out of opposing segments of the walls of the tubular body 20. The slots 56 extend axially (relative to body 20) in the tubular walls for a length determined by the desired range of movement of locks 40, 40'. In the embodiment shown, the four slots 56 are each approximately one inch long, to accomodate an approximate one inch axial retraction of locks 40, 40'. Because of the extension of pins 54 through one outer wall of lock 40 or 40', through the slots 56 of the body 20, and into the opposite outer wall of lock 40 or 40', the pins 56 also function to retain locks 40 on the body 20. The pins 54 cannot slip out of the closed slots 56, thus holding locks 40, 40' in place on body 20.

As mentioned above, the locks 40, 40' are normally biased in a first, or extended position wherein the locks extend outwardly beyond the shank 36 of the hooks. Note that the terminal or outer portions of the locks, when the locks are normally extended, form a skirt 42 which lies approximately adjacent and substantially surrounds the rounded portion 38 of the hooks. With the locks so positioned around the hooks, the ends of the locks are biased against the IV-pole or the gurney frame when the hooks are attached thereto, preventing the hooks from detaching. To allow better seating of the locks around the selected portion of the IV-pole or gurney, the skirts 42 of the locks include arcuately curved terminal edges 44. The curved edges 44 provide contour sufficient to permit the ends of the locks 40 to seat closely and securely around the bars 12 or I, whether vertically or horizontally oriented. Obviously the arcuate or cutaway areas 44 can be shaped as necessary to accommodate round or square connecting members.

Figure 3:
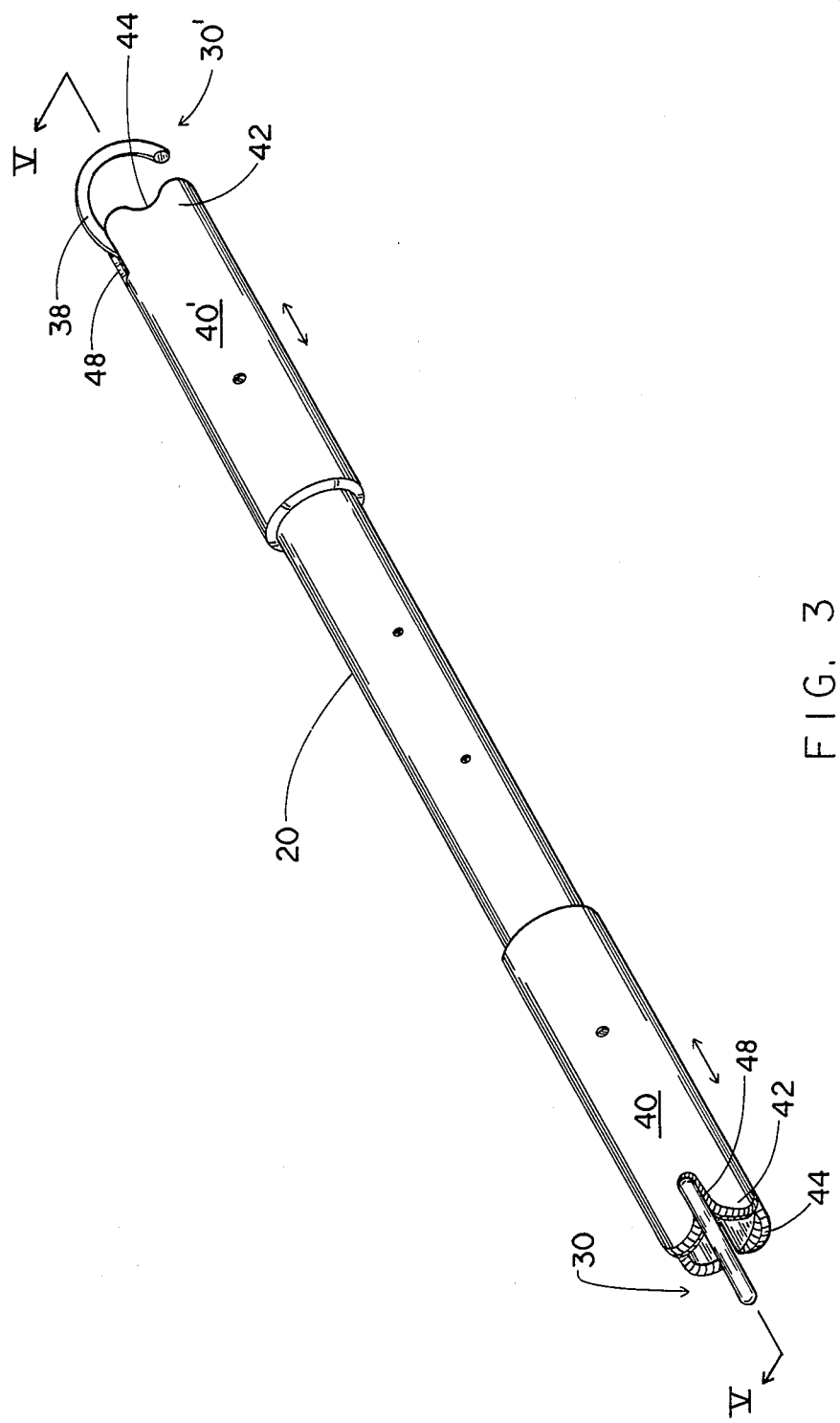
FIG. 3 is a perspective view of the device alone, according to a preferred embodiment and showing the locking means in its normal extended position.

Also provided on each of locks 40, is an axially extending slot 48, open at the skirt ends, to accommodate the hooks 30, 30' (see FIG. 3). The slot 48 is cut out of the wall of each lock 40 for purposes of providing clearance for the shank and body portion of hook 30, when the lock 40 is adjusted axially. This structure further inhibits rotation of the locks after they are attached to a gurney or pole.

Other and further modifications may become apparent to those skilled in the art of the present invention. However, because the above description is not intended to be limiting, such modifications must be examined in light of the claims below.

What is claimed is:

1. A device for linking a small-wheeled vechicle to an object to be towed from one location to another, said tow device comprising
   (a) an elongated, rigid body portion;
   (b) a hooking member mounted on each end of said body portion for attaching said tow device to the vechicle and to the object being towed;
   (c) locking means for removably locking said hooking members to the respective vehicle or object to which said hooking member is attached;
   (d) said locking means being movable between: (1) a first position wherein said hooking member and a portion of the surface of the vehicle or towed object are engaged by said locking means, and (2) a second, retracted position wherein said locking means is out of engagement with said hooking member and the surface of the vehicle or towed object and said hooking member may be connected to or disconnected from the vehicle or object being towed;
   (e) said locking means including:
      (i) a first hollow, tubular member mounted in telescopic relationship over one end of said body portion, and a second hollow, tubular member mounted in telescopic relationship over the opposite end of said body portion;
      (ii) a portion of each of said first and second tubular members extending beyond the respective ends of said body portion to form first and second forwardly extending skirts; each of said first and second skirts overlying a prescribed portion of one of the respective hooking members when said locking means is in said first position;
      (iii) each of said first and second skirts including a means for seating on a portion of the surface of the vehicle or object to which the respective one of said hooks is attached, when said locking means is in said first position;
(f) means for biasing said locking means to said first position;
whereby said locking means, when in said first position, substantially overlie said hook members and are biased against the vehicle, or object, to prevent disengagement of said hooks therefrom.

2. A device according to claim 1 wherein said means for seating said skirts on a portion of the surface of the vehicle, or object, being towed comprises a terminal outer edge of each of said skirts having arcuately curved portions to seat against the surface to which said device is attached.

3. A device according to claim 1 wherein said means for biasing said locking means to said first position is comprised of:
(a) said body portion including a tubular portion therethrough and at least one compression spring mounted is said tubular portion;
(b) retaining means for maintaining said first and second hollow tubular members on the ends of said body portion when in said first position;
(c) said compression spring being normally fully extended and biased against said retaining means to hold said first and second tubular members in said first position.

* * * * *